3,817,910
LOW COMPRESSION SET SILOXANE ELASTOMERS
George Juris Viksne, Adrian, Mich., assignor to Stauffer Chemical Company, New York, N.Y.
No Drawing. Filed Jan. 2, 1973, Ser. No. 319,953
Int. Cl. C08g 51/04
U.S. Cl. 260—37 SB          10 Claims

ABSTRACT OF THE DISCLOSURE

Silicone elastomers having low compression set may be obtained by incorporating alkaline earth metal silicates in curable organopolysiloxane compositions.

---

The present invention relates to heat curable silicone elastomers and more particularly to low compression set heat curable silicone elastomers.

Silicone elastomers are generally stable at temperatures below about 150° C. and may be used at temperatures up to about 260° C. and even up to 315° C. for short periods of time. When these silicone elastomers are used at temperatures, for example above 120° C., compression set of the elastomer is an important property. At temperatures above 150° C. for example, the compression set of conventional siloxane elastomers will run as high as 95 percent when subjected to A.S.T.M. test D395—Method B. Since silicone rubbers are normally employed in these temperature ranges, it can be seen that it is necessary to reduce the compression set in order to have a material useful for gasketing and similar applications. It has been found in the past that oxides, peroxides or carbonates of cadmium will reduce the compression set at elevated temperatures; however, the cadmium compounds do not accelerate the cure rate or act as scavengers for the catalytic residue.

Therefore, it is an object of this invention to provide heat curable silicone elastomers having improved compression set. Another object of this invention is to provide a heat curable silicone elastomer which contains a scavenger for the catalyst residue. Still another object of this invention is to provide silicone elastomers having an accelerated cure rate. Still another object of this invention is to provide a method for improving the compression set of heat curable silicone elastomers. A further object of this invention is to provide silicone elastomers which do not require post curing.

The foregoing objects and others which will become apparent from the following description are accomplished in accordance with this invention, generally speaking, by incorporating alkaline earth metal silicates having a surface area of from 50 to 500 m.²/gram in heat curable organopolysiloxane compositions. The compositions when vulcanized at elevated temperatures will exhibit improved compression set.

These alkaline earth metal silicates also act as scavengers for the catalytic residue and prevent "blooming." In addition to the benefits described above, these alkaline earth metal silicates also accelerate the cure rate of the organopolysiloxane compositions.

The silicone elastomers of this invention are prepared in the conventional manner, namely by curing at elevated temperatures heat curable organopolysiloxanes containing alkaline earth metal silicates, vulcanizing agents, fillers, and if desired, additional reinforcing and nonreinforcing fillers. The compositions when properly cured, will provide silicone elastomers having improved compression set.

While the presence of the alkaline earth metal silicates in these compositions will improve the physical properties of the silicone elastomers, its effectiveness is not contingent upon the type of organopolysiloxane employed. The organopolysiloxanes useful in the invention are commonly referred to as dialkyl or alkylaryl polysiloxane gums. These organopolysiloxanes are well known in the art and methods for producing such materials are old and widely described in the literature. The curable organopolysiloxanes have a Williams plasticity range of from 50 to 250 millimeters and have recurring structural units of the general formula:

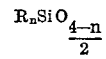

where $n$ is a number of from about 1.9 to 2.2 and R represents monovalent hydrocarbon radicals, such as alkyl, aryl, aralkyl, alkaryl, alkenyl, halogenated and cyano-substituted aryl radicals. It is also desirable that in the curable organopolysiloxanes the majority of the R radicals be lower alkyl radicals, for example, methyl radicals. It is usually preferred that the organopolysiloxanes from which the curable compositions are prepared contain an average of from about 1.98 to about 2.2 organic groups, for instance, methyl groups or methyl phenyl groups, etc., per silicon atom and that more than 98 percent of the silicon atoms of the polysiloxane contain two silicon bonded organic groups, for instance, alkyl groups or a mixture of alkyl and aryl groups, etc., per silicon atom. Included specifically in this formula are the dimethylpolysiloxanes, methylphenylpolysiloxanes, methylvinylpolysiloxanes, and copolymers of such units, such as copolymers containing dimethyl- and phenylmethylsiloxane units and copolymers containing phenylmethyl-, dimethyl- and vinylmethylsiloxane units.

Various antistructuring agents may be incorporated in the compositions of this invention to prevent hardening or "crepe aging" of the materials prior to vulcanization. Examples of suitable antistructuring agents are water; hydroxyl-terminated silanes and siloxanes having a viscosity of from about 30 to 100 centistokes, such as diphenylsilane diols, methylphenylsilane diols, hydroxylated methylpolysiloxanes, hydroxylated methylphenylpolysiloxanes, hydroxylated diphenylpolysiloxanes; methyl endblocked dimethylpolysiloxane fluids; low molecular weight alkoxylated siloxanes; phosphate fluids, such as tripropylphosphate and tributylphosphate; glycols, such as methylene glycol and propylene glycol; esters; and anhydrides, such as phthalic anhydride.

The amount of antistructuring agents employed in these compositions generally ranges from about 2 to 30 percent preferably from about 5 to 20 percent, by weight based on the weight of the organopolysiloxane polymers.

Metal silicates which are particularly effective in providing low compression set silicone elastomers are finely dispersed alkaline earth metal silicates such as calcium silicate, barium silicate, magnesium silicate and calcium aluminum silicates. The alkaline earth metal silicates have a surface area of from 50 m.²/g. up to about 500 m.²/g. The surface area of the metal silicates is critical in order to provide a composition having improved compression set.

The amount of metal silicate may range from about 0.5 to about 30 percent by weight based on the weight of the organopolysiloxane polymer. Generally amounts ranging from about 7 to 15 and more preferably from about 3 to 10 percent by weight based on the weight of the organopolysiloxane polymers are sufficient to provide low compression set elastomers.

Other finely divided fillers, such as reinforcing and nonreinforcing fillers may be incorporated in the curable organopolysiloxane compositions. The amount of fillers used in combination with the organopolysiloxane polymers may be varied within wide limits, for instance, from about 10 to 300 percent by weight of fillers based on the weight of the organopolysiloxane polymers. The exact amount of fillers used will depend upon such factors as, for instance, the application for which the curable organopolysiloxane composition are intended, the type of fillers employed, e.g., the density of the fillers, the type of curable organopolysiloxanes employed, etc. Obviously, mixtures of reinforcing fillers with nonreinforcing fillers may be employed.

Examples of suitable fillers which may be used are asbestos, clay, hydrated calcium silicate, zinc sulfide, silica aerogel, barium titanate, glass fiber, floc, iron oxide, bentonite, zinc oxide, nickelous oxide, magnesium oxide, micronized graphite, micronized slate, micronized mica, celite, lead dioxide, lead oxide, blue lead, alumina, either hydrated or dehydrated titanium dioxide and calcium carbonate.

Various curing agents may be added to the organopolysiloxane compositions to effect rapid conversion of the compositions to an elastomeric state. Among such curing agents may be mentioned, for example, benzoyl peroxide, t-butyl perbenzoate, bis (2,4-dichlorobenzoyl) peroxide, dicumyl peroxide, dialkyl peroxides, such as di-t-butyl peroxide, p-chlorobenzoyl peroxide etc. These curing agents may be present in amounts ranging from about 0.1 to as high as 4 to 8 percent by weight or even more based on the weight of the organopolysiloxane polymers.

The manner in which the present invention may be practiced may be widely varied. Although the metal silicates may be incorporated in the curable organopolysiloxane polymers before the addition of the reinforcing fillers, it may be incorporated simultaneously with the other fillers. Curing agents and other additives, such as dyes, pigments, and flame retardants, may be added to the organopolysiloxane compositions during the milling operation.

Alternatively, the metal silicates may be added to the organopolysiloxane compositions and then milled with the reinforcing and nonreinforcing fillers at some future time.

The organopolysiloxane compositions of this invention may be molded or extruded and cured in accordance with the conventional techniques known in the art. They may be cured at temperatures ranging from about 100° to 200° C. or more for varying periods of time ranging from less than 1 minute up to several hours.

Silicone elastomers of this invention which contain at least 0.1 percent and preferably not more than 15 percent of metal silicates based on the weight of the organopolysiloxane polymers exhibit improved compression set over the conventional silicone elastomers and/or silicone elastomers containing conventional additives known in the art to improve the compression set.

The silicone elastomers of this invention are capable of withstanding elevated temperatures of from 100° to over 200° C. for extended periods of time and still retain a low compression set. Such a range of properties makes them highly useful as insulating materials for electrical conductors and for the production of commercial items such as tubing, hoses, sheeting, gaskets and the like.

The embodiments of this invention are further illustrated by the following examples in which all parts are by weight unless otherwise specified.

EXAMPLE I

A polysiloxane gum is prepared by co-reacting octamethylcyclotetrasiloxane and tetramethyltetravinylcyclotetrasiloxane in such proportions that the gum contains about 0.2 mole percent methyl vinyl siloxane with 0.001 percent by weight potassium hydroxide at a temperature of about 140° to 150° C. from 4 to 5 hours. The polysiloxane gum contains an average of about 2.0 methyl groups per silicon atom.

EXAMPLE II

The organopolysiloxane gum prepared in accordance with the procedure described in Example I is utilized in the formulations shown in Table I.

TABLE I

| Ingredients | Formulation, parts | |
|---|---|---|
| | (A) | (B) |
| Polysiloxane gum (example 1) | 100 | 100 |
| OH-terminated polydimethylsiloxane (50 cs.) | 6.0 | 6.0 |
| Diphenylsilane diol | 2.0 | 2.0 |
| Fumed silica (Cab-O-Sil) | 50.0 | 50.0 |
| 2,5-di-t-butylperoxy-2,5-dimethylhexane | 0.8 | 0.8 |
| Calcium silicate (100 m.²/g.) | | 10.0 |

Each of the formulations shown in Table I is molded and press-cured for 15 minutes at 171° C. at a pressure of 600 p.s.i. The physical properties of each formulation are illustrated in the table below. The compression set is determined in accordance with A.S.T.M. test D395—Method B after 22 hours at a temperature of 171° C.

TABLE II

| Physical properties | Formulation | |
|---|---|---|
| | (A) | (B) |
| Tensile strength, p.s.i. | 1,050 | 980 |
| Elongation, percent | 350 | 305 |
| Hardness, Shore A | 64 | 72 |
| Compression set, percent (22 hrs./171° C.) | 66 | 42 |

Formulation (B) shows the advantage of using calcium silicate in improving the compression set of the cured elastomer.

EXAMPLE III

In this example, formulations are prepared which contain 100 parts of polysiloxane gum prepared in accordance with Example I, 6.0 parts of a hydroxyl-terminated polydimethylsiloxane (50 cs.) 2.0 parts of diphenylsilane diol, and 0.8 part of 2,5-di-t-butyl-peroxy-2,5-dimethylhexane. Various amounts of calcium silicate and fumed silica (Cab-O-Sil) are added to these basic formulations. These formulations are press-cured for 15 minutes at 171° C. at a pressure of 600 p.s.i. The physical properties of each formulation are illustrated in the table below. Compression set is determined in accordance with the procedure described in Example II.

TABLE III

| Formulation | | | Physical properties | | | |
|---|---|---|---|---|---|---|
| Number | Calcium silicate, parts (200 m.²/g.) | Fumed silice, parts | Tensile strength, p.s.i. | Elongation, percent | Hardness, Shore A | Compression set, percent |
| (A) | 0 | 50 | 1,050 | 350 | 64 | 66 |
| (B) | 10 | 50 | 980 | 305 | 72 | 42 |
| (C) | 20 | 30 | 650 | 280 | 51 | 35 |
| (D) | 36 | 0 | 300 | 200 | 37 | 5 |

EXAMPLE IV

A polysiloxane base is prepared by mixing 100 parts of the polysiloxane gum prepared in accordance with Example I with 7.0 parts of a hydroxyl-terminated polydimethylsiloxane (500 cs.) and 30 parts of fumed silica (Cab-O-Sil) at a temperature up to about 177° C. for about 3 hours.

A curing catalyst and various silicates are added to the polysiloxane base prepared above and mixed on a two-roll mill. Each formulation is molded and press-cured for 25 minutes at 115° C. The formulations are illustrated in Table IV and their physical properties are illustrated in Table V. Compression set is determined in accordance with the procedure described in Example II.

TABLE IV

| Ingredients | Formulation, parts | | |
|---|---|---|---|
| | A | B | C |
| Polysiloxane base | 100.0 | 100.0 | 100.0 |
| Bis (2,4-dichlorobenzoyl) peroxide | 0.65 | 0.65 | 0.65 |
| Magnesium silicate (100 m.²/g.) | | 5.0 | |
| Calcium aluminum silicate (200 m.²/g.) (SiO²—60%, CaO—30%, Al₂O₃—10%) | | | 5.0 |

TABLE V

| Physical properties | Formulation | | |
|---|---|---|---|
| | A | B | C |
| Tensile strength p.s.i. | 700 | 660 | 650 |
| Elongation, percent | 300 | 265 | 250 |
| Hardness, Shore A | 50 | 53 | 55 |
| Compression set, percent (22 hrs./171° C) | 35 | 27 | 15 |

After standing for about 28 days, a solid film is observed on the surface of the molded rubber prepared from formulation (A). No film formation is observed on the rubber molded from formulations (B) and (C). This phenomenia is generally referred to as "blooming" and is generally attributed to the accumulation of the curing catalyst residue on the surface of the molded rubber.

In addition to providing a low compression set siloxane rubber, the silicates accelerate the cure rate and also act as scavangers for the catalyst residue.

When other organopolysiloxane polymers containing for example, from 0.01 to 0.35 mole percent methylvinylsiloxane groups are substituted for the methylvinylpolysiloxane gum in these examples, similar results are obtained. Also, when the above examples are repeated utilizing other antistructuring agents and silicates, silicone elastomers are obtained which have improved compression set.

Although specific examples of the invention have been described herein, it is not intended to limit the invention solely thereto, but to include all the variations and modifications falling within the spirit and scope of the appended claims.

What is claimed is:

1. A heat curable organopolysiloxane composition having improved compression set which comprises an organopolysiloxane polymer having recurring structural units of the general formula

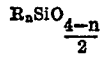

wherein R is selected from the group consisting of monovalent hydrocarbon radicals, halogenated monovalent hydrocarbon radicals and cyano-substituted aryl radicals, and $n$ is a number of from 1.9 to 2.2, an organic peroxide curing agent and at least 0.5 percent by weight based on the weight of the organopolysiloxane polymer of an alkaline earth metal silicate having a surface area of from 50 to 500 m.²/g.

2. The composition of claim 1 wherein the composition contains from 0.5 to 30 percent by weight of the metal silicate.

3. The composition of claim 1 wherein the organopolysiloxane polymer has from 1.9 to 2.2 organic radicals per silicon atom.

4. The composition of claim 1 which includes an antistructuring agent selected from the group consisting of water, hydroxyl-terminated silanes and siloxanes, methyl endblocked polysiloxane fluids, alkoxylated organopolysiloxanes, phosphate fluids, glycols, esters and anhydrides thereof in an amount of from about 2 to 30 percent by weight based on the weight of the organopolysiloxane polymer.

5. The composition of claim 1 wherein the organopolysiloxane polymer is a copolymer of a dimethylsiloxane and a methylvinylsiloxane.

6. The composition of claim 1 wherein the metal silicate is calcium silicate.

7. The composition of claim 1 wherein the metal silicate is barium silicate.

8. The composition of claim 1 wherein the metal silicate is magnesium silicate.

9. The heat cured organopolysiloxane elastomer of claim 1, in which the organopolysiloxane elastomer is composed of an organopolysiloxane polymer and at least 0.5 percent by weight based on the weight of the organopolysiloxane polymer of an alkaline earth metal silicate having a surface area of from 50 to 500 m.²/g.

10. The elastomer of claim 9 wherein the organopolysiloxane polymer is a copolymer of a dimethylsiloxane and a methylvinylsiloxane.

References Cited
UNITED STATES PATENTS

| 3,236,806 | 2/1966 | Dunham, Jr. | 260—46.5 G |
| 3,054,769 | 9/1962 | Pike | 260—37 SB |
| 3,644,434 | 2/1972 | Hittmair et al. | 260—46.5 G |
| 3,647,741 | 3/1972 | Hutchinson | 260—37 SB |

MELVYN I. MARQUIS, Primary Examiner

U.S. Cl. X.R.

260—30.6 SB, 31.2 R, 33.4 SB, 46.5 G, 825, DIG. 33